US006535877B1

(12) United States Patent
Hirayama

(10) Patent No.: US 6,535,877 B1
(45) Date of Patent: Mar. 18, 2003

(54) PATTERN RECOGNITION APPARATUS

(75) Inventor: Hiroshi Hirayama, Tokyo (JP)

(73) Assignee: NEC Corporation, Tokyo (JP)

( * ) Notice: Subject to any disclaimer, the term of this patent is extended or adjusted under 35 U.S.C. 154(b) by 288 days.

(21) Appl. No.: 09/638,892

(22) Filed: Aug. 16, 2000

(30) Foreign Application Priority Data

Aug. 16, 1999 (JP) .......................................... 11-229781

(51) Int. Cl.⁷ .............................................. G06F 17/30
(52) U.S. Cl. ...................................................... 707/6
(58) Field of Search .............................. 707/6; 382/37; 364/419.08; 345/331

(56) References Cited

U.S. PATENT DOCUMENTS

| | | | | |
|---|---|---|---|---|
| 5,067,166 A | * | 11/1991 | Ito | 382/215 |
| 5,418,717 A | * | 5/1995 | Su et al. | 704/9 |
| 5,894,306 A | * | 4/1999 | Ichimura | 101/462 |

FOREIGN PATENT DOCUMENTS

JP 10-153999 6/1998

* cited by examiner

*Primary Examiner*—Diane D. Mizrahi
(74) *Attorney, Agent, or Firm*—McGinn & Gibb, PLLC

(57) ABSTRACT

A pattern recognition apparatus includes a plurality of net structure dictionaries, reconstruction section, a first storage section, and a pattern matching section. Each net structure dictionary has a net structure formed by a parent arc representing a common portion of a plurality of standard patterns to a child arc representing a remaining portion. The reconstruction section extracts a common structure from the net structure dictionaries and reconstructs them to generate a reconstructed dictionary. The first storage section stores connecting information representing the relationship between the extracted common structure and the net structure dictionaries. The pattern matching section refers to the plurality of net structure dictionaries, reconstructed dictionary, and the connecting information and performs pattern matching processing between an input pattern and recognition targets formed from standard patterns using beam search.

9 Claims, 8 Drawing Sheets

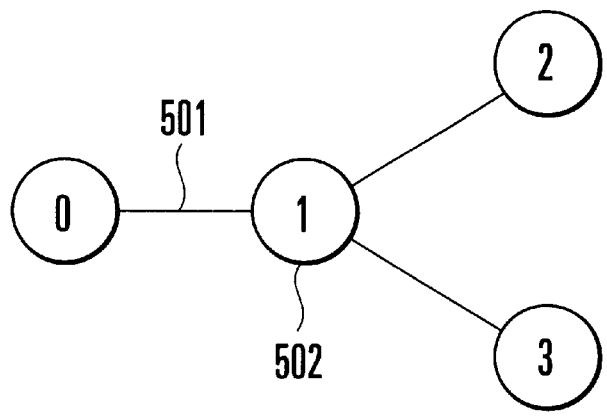
F I G. 5

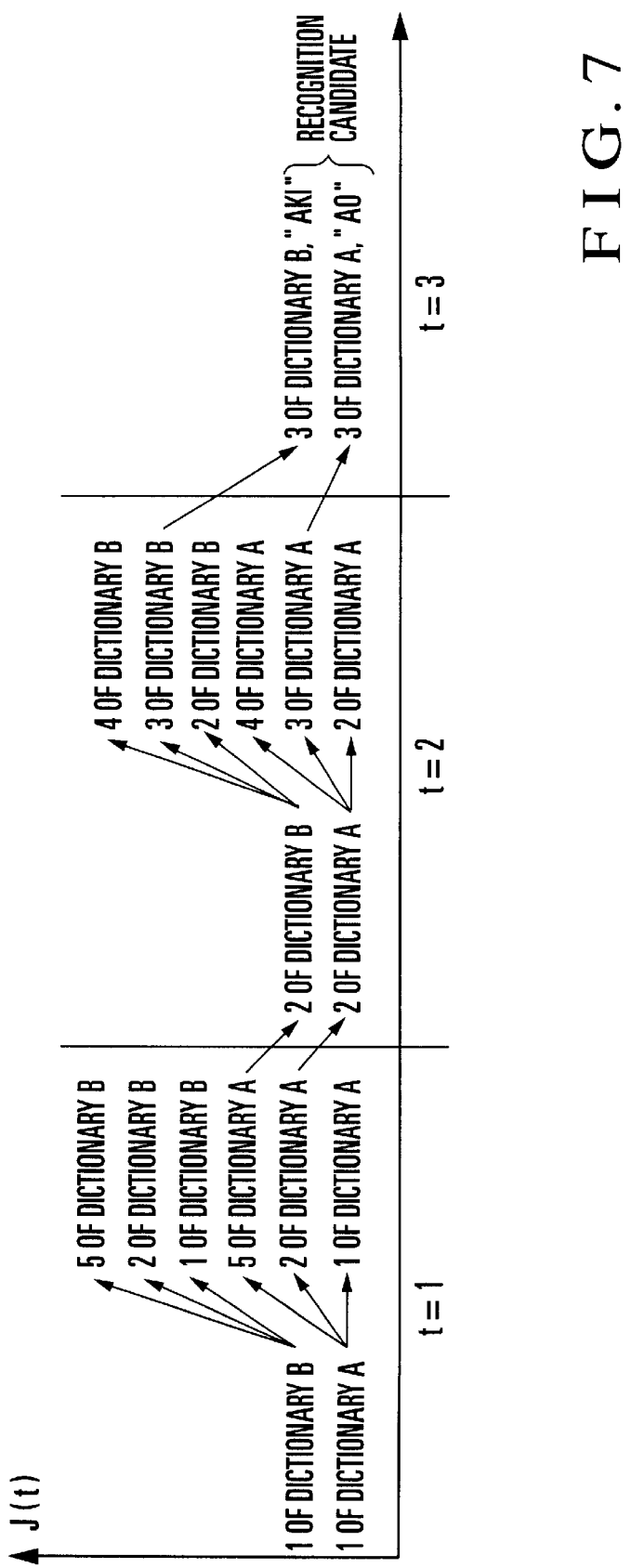
F I G. 7

PATTERN RECOGNITION APPARATUS

BACKGROUND OF THE INVENTION

The present invention relates to a pattern recognition apparatus which performs pattern matching between an input pattern as a recognition target and standard patterns described in a plurality of net structure dictionaries using beam search, thereby obtaining a recognition candidate.

Conventionally, when the number of objects to be recognized is very large in voice recognition or the like, pattern matching using beam search is used with which pattern recognition using a small-capacity RAM (Random Access Memory) and a small quantity of calculation is enabled, as disclosed in H. Sakoe et al., "A High Speed DP-Matching Algorithm Based on Synchronization, Beam Search and Vector Quantization", THE TRANSACTIONS OF THE INSTITUTE OF COMMUNICATION ENGINEERS, Vol. J71-D, No. 9, pp. 1650–1659, September 1988 (reference 1).

Beam search is a technique of removing matching paths that do not affect the recognition result using a net structure dictionary. To avoid influence on the recognition result, many paths must be left at the initial stage, as pointed out in Japanese Patent Laid-Open No. 10-153999 (reference 2). However, when the standard patterns of the recognition target are described in the net structure dictionary, the number of matching paths to be searched is small by itself, and the number of paths to be left can also be relatively small. Hence, when a recognition apparatus is formed using a net structure dictionary, the capacity of a storage means for storing paths can be small.

For pattern recognition, the recognition rate becomes high when the number of recognition targets is small. For this reason, preferably, the use conditions are finely sorted, and a small number of targets are recognized in units of finely sorted conditions. On the other hand, in some cases, recognition targets under different use conditions, e.g., place names in each administrative district and nationwide place names may be simultaneously recognized. If it is known that only a place name in a specific administrative district is to be recognized, a net structure dictionary related to this specific administrative district is used as a recognition target, thereby improving the recognition rate. If a nationwide place name is to be recognized, the place name dictionary for each administrative district is simultaneously used together as a recognition target.

In this case, the dictionary for the nationwide place names is unnecessary. Unlike a case wherein nationwide and administrative district dictionaries are independently prepared, the capacity of a storage means (memory) for storing the dictionaries is halved. Thus, when a plurality of dictionaries can be simultaneously used as recognition targets, the dictionary storage capacity can be reduced.

A conventional pattern-recognition apparatus which performs pattern matching using beam search which uses a plurality of net structure dictionaries as recognition targets will be described next. As shown in FIG. 4, this pattern recognition apparatus comprises two, net structure dictionary (A) 401 and net structure dictionary (B) 402, a beam search pattern matching section 403, input section 404, and display section 405.

Using the beam search algorithm described in reference 1, the beam search pattern matching section 403 obtains the pattern distance between an input pattern input from the input section 404 and a standard pattern described in each of the net structure dictionaries 401 and 402 and outputs to the display section 405 a recognition target in a dictionary, which gives the minimum pattern distance, as a recognition result.

The operation of the conventional pattern recognition apparatus will be described below in more detail.

Prior to the description of the operation, a general net structure dictionary will be described. A net structure dictionary is a set of recognition target words and is designed to connect an arc 501 corresponding to a tone of a recognition target word to a numbered node 502 so as to form each recognition target word, as shown in FIG. 5.

Letting v be the dictionary number, and $\lambda v$ be the net structure dictionary, the net structure dictionary having the structure shown in FIG. 5 is described as follows. Note that Av is the set of arcs representing a standard pattern, Nv is the set of nodes connecting arcs, Wv is the recognition target set, ENv is the end node set, PAv is the partial arc set, and WNv is the recognition target node set.

$\lambda v = (Nv, Av, Wv, ENv, PAv, WNv) \{V=1, 2, \ldots, V\}$ $Nv = \{nv\_i: i=0, 1, \ldots, Iv\}$ $Av = \{av\_j: j=1, 2, \ldots, Jv\}$ $Wv = \{wv\_k: k=1, 2, \ldots, Kv\}$ $ENv(av\_j)$: the end node of an arc $av\_$;

$PAv(nv\_i)$: the set of arcs having a node $nv\_i$ as a start node $WNv(wv\_k)$: a node representing the end of a word $wv\_k$ With this description, a net structure dictionary shown in FIG. 6 is constructed. As shown in FIG. 6, in a net structure dictionary A, an arc "A(2)" common to recognition target words "AO ("blue" in Japanese)" and "AKA ("red" in Japanese)" is connected to arcs "O(3)" and "KA(4)" by node #2, thereby forming a net structure. Additionally, an arc "I(5)" common to recognition target words "IKE ("pond" in Japanese)" and "ISHI ("stone" in Japanese)" is connected to arcs "KE(6)" and "SHI(7)" by node #5, thereby forming a net structure.

In a net structure dictionary B, an arc "A(2)" common to recognition target words "AKI ("autumn" in Japanese)" and "ASA ("morning" in Japanese)" is connected to arcs "KI(3)" and "SA(4)" by node #2, thereby forming a net structure. Similarly, an arc "U(5)" common to recognition target words "UE ("upside" iin Japanese)" and "USU ("mortar" in Japanese)" is connected to arcs "E(6)" and "SU(7)" by node #5, thereby forming a net structure.

In the above net structure, the independent beam search pattern matching section 403 (FIG. 4) obtains a recognition result by the following procedure. In the following description, let $X=(x0 x1 x2 \ldots xt \ldots xT)$ (t is time) be the input pattern, $d(t, v\_j)$ be the local pattern distance between the input pattern $xt$ at time $t$ and the arc $av\_j$, $g(t, \cdot)$ be the accumulated distance of local pattern distances until time $t$, and $J(t)$ be the set of standard patterns of arcs on the search matching path at time $t$. A standard pattern of an arc is represented by a standard pattern of DP-matching described in reference 1.

Letting S be the maximum number of search matching paths, a recognition result w is obtained. Additionally, let $\min[\ ]$ be a calculation that gives the minimum value, and $\operatorname{argmin}[g(\cdot, k)|S]$ be a calculation for acquiring the value $k$ that gives the Sth value $g$ in the ascending order.

<Initial Settings>
Step S20
  $J(t=0)=\{0\_1\}$
  $g(t=0, v\_k)=\infty\{k=0, 1, \ldots, Jv, v=1, \ldots V\}$
  $g(t=0, 0\_1)=d(0, 0\_1)$ $t=1$
<Processing Main Body>
Step S21
  $g(t, v\_k)=\min[g(t-1, v\_k), g(t-1, v\_j)]+d(t, v\_k)$
  $\{av\_k \in PAv(EN(av\_j)), v\_j \in J(t-1)\} J(t)=\{\text{argmin}[g(t, v\_k)|S]\}$
Step S22
  If t<T, the flow advances to step S21.
Step S23
  $v\_m=\text{argmin}[g(T, v\_k)|1]$
  $v\_k \in J(t), EN(av\_k) \in WNv, v=1, 2, \ldots, V$
  Recognition result: w that satisfies $WNv(w)=EN(av\_m)$
END However, when a plurality of dictionaries are used, as described above, a plurality of search matching paths with the same connection of standard patterns are present although the dictionaries are net structure dictionaries. For this reason, unless the number of paths to be left without being removed is increased, the recognition result is affected, as will be described below.

For example, the two net structure dictionaries A and B having the structures shown in FIG. 6 are used, the search matching path passes through the same arc of the two dictionaries. In this case, matching processing shown in FIG. 7 is executed.

More specifically, at time t=1, the independent beam search pattern matching section 403 (FIG. 4) loads, to the internal RAM, the arc (1) connected to node #1 of the net structure dictionary (A) 401 and the arc (1) connected to node #1 of the net structure dictionary (B) 402. Next, the independent beam search pattern matching section 403 selects the arcs (5), (2), and (1) connected to nodes #5, #2, and #1 of the net structure dictionary (A) 401 and the arcs (5), (2), and (1) connected to nodes #5, #2, and #1 of the net structure dictionary (B) 402 as next recognition candidates.

At time t=2, the independent beam search pattern matching section 403 selects and loads, to the internal RAM, the arc (2) connected to node #2 of the net structure dictionary (A) 401 and the arc (2) connected to node #2 of the net structure dictionary (B) 402 as arcs (search matching path) matching the input recognition target. Next, the independent beam search pattern matching section 403 selects the arcs (4), (3), and (2) connected to nodes #4, #3, and #2 of the net structure dictionary (A) 401 and the arcs (4), (3), and (2) connected to nodes #4, #3, and #2 of the net structure dictionary (B) 402 as next recognition candidates.

Finally, at time t=3, the independent beam search pattern matching section 403 selects the arc (3) connected to node #3 of the net structure dictionary (A) 401 and the arc (3) connected to node #3 of the net structure dictionary (B) 402 as arcs matching the input recognition target, connects them to the arcs that have already been loaded to the internal RAM, and displays them on the display section 405 as a result of recognition candidate.

In the above-described recognition, when the voice to be recognized is "IKE (pond in Japanese)", a recognition error occurs in selection at time t=2. If a recognition error occurs at the initial stage, "IKE (pond in Japanese)" as a recognition target word is not recognized when the two net structure dictionaries are used, as described above.

On the other hand, as shown in FIG. 8, when a single net structure dictionary is used, the arcs "O", "KA", "KI", and "SA" are connected, through node #2, to the arc "A" common to the recognition target words "AO (blue in Japanese)", "AKA (red in Japanese)", "AKI (autumn in Japanese)", and "ASA (morning in Japanese)", thereby forming a net structure. In addition, the arcs "KE" and "SHI" are connected, through node #7, to the arc "I" common to the recognition target words "IKE (pond in Japanese)" and "ISHI (stone in Japanese)", thereby forming a net structure. Furthermore, the arcs "E" and "SU" are connected, through node #10, to the arc "U" common to the recognition target words "UE (upside in Japanese)" and "USU (mortar in Japanese)", thereby forming a net structure.

When the single net structure dictionary shown in FIG. 8 is used, matching processing shown in FIG. 9 is executed. In this case, first at time t=1, the independent beam search pattern matching section receives the arcs connected to node #1 into the internal RAM. Next, the independent beam search pattern matching section selects the arcs (10), (7), (2), and (1) connected to nodes #10, #7, #2 and #1 as next recognition candidates.

At time t=2, the independent beam search pattern matching section selects and loads, to the internal RAM, the arcs (7) and (2) connected to nodes #7 and #2 as arcs (search matching path) matching the input recognition target. The independent beam search pattern matching section 403 selects arcs (9) to (2) connected to nodes #9, #8, #7, #6, #5, #4, #3, and #2 as next recognition candidates.

Finally, at time t=3, the independent beam search pattern matching section selects the arcs (8) and (3) connected to nodes #8 and #3 as arcs matching the input recognition target and connects them to the arcs that have already been loaded to the internal RAM, thereby obtaining a result of recognition candidate. In this case, even when an recognition error occurs at time t=2, "IKE (pond in Japanese)" is finally selected as a recognition candidate.

Referring to FIGS. 7 and 9, the phase where one arc branches to a plurality of arcs represents not that the arcs are selected but that they are matching targets according to equation in step S21. Conversely, in the phase where the number of arcs decreases, the arcs are selected.

As described above, when a plurality of net structure dictionaries are used, as in the prior art, a plurality of search matching paths pass through the same standard patterns until the midway. Hence, the recognition performance degrades as compared to use of a single dictionary.

Degradation in recognition performance in use of a plurality of net structure dictionaries can be compensated by increasing the maximum number of search matching paths. In this case, however, the accumulated distance or the number of arcs on the search matching paths increases in proportion to the maximum number of search matching paths, so the capacity of RAM for storing these pieces of information increases as compared to use of a single dictionary.

On the other hand, when a single net structure dictionary is used, as described above, the recognition performance can be held without increasing the maximum number of search matching paths. However, in case of the single net structure dictionary, since the quantity of data of the dictionary is large, generation of the dictionary is time-consuming, resulting in long time required for recognition. In addition, when a single dictionary is used, undesirable arcs are also recognized, and the recognition rate becomes poor.

To solve this problem, when the single dictionary is stored in a ROM (Read Only Memory) in advance, the dictionary generation time can be shortened. However, when the dictionary is formed from a number of arcs, the number of combinations of arcs is very large. For this reason, the capacity of the ROM required to form the net structure dictionary also becomes large.

Summarizing the problems of the prior art, when a plurality of net structure dictionaries are used to suppress degradation in recognition performance, the RAM requires a large capacity. On the other hand, when a single dictionary is used, a long time is required for recognition, or the ROM requires a very large capacity.

SUMMARY OF THE INVENTION

It is an object of the present invention to provide a pattern recognition apparatus capable of simultaneously using a plurality of net structure dictionaries to set a recognition target with a variety of choices.

It is another object of the present invention to provide a pattern recognition apparatus which requires no large-capacity RAM for compensating the recognition performance.

In order to achieve the above objects, according to the present invention, there is provided a pattern recognition apparatus comprising a plurality of net structure dictionaries each having a net structure formed by connecting, through a node, a parent arc representing a common portion of a plurality of standard patterns as recognition units of a recognition target to a child arc representing a remaining portion, reconstruction means for extracting a common structure from the plurality of net structure dictionaries and reconstructing the net structure dictionaries to generate a reconstructed dictionary, first storage means for storing original dictionary connecting information representing a relationship between the extracted common structure and the plurality of net structure dictionaries, and pattern matching means for referring to the plurality of net structure dictionaries, the reconstructed dictionary generated by the reconstruction means, and the original dictionary connecting information stored in the first storage means and performing pattern matching processing between an input pattern and recognition targets formed from standard patterns using beam search, thereby selecting a recognition candidate from the recognition targets.

BRIEF DESCRIPTION OF THE DRAWINGS

FIG. 5 is a view showing the basic structure of a net structure dictionary;

FIG. 7 is a timing chart showing the recognition operation of the conventional pattern recognition apparatus using the net structure dictionaries shown in FIG. 6;

DESCRIPTION OF THE PREFERRED EMBODIMENT

The present invention will be described below with reference to the accompanying drawings.

Figure 1:
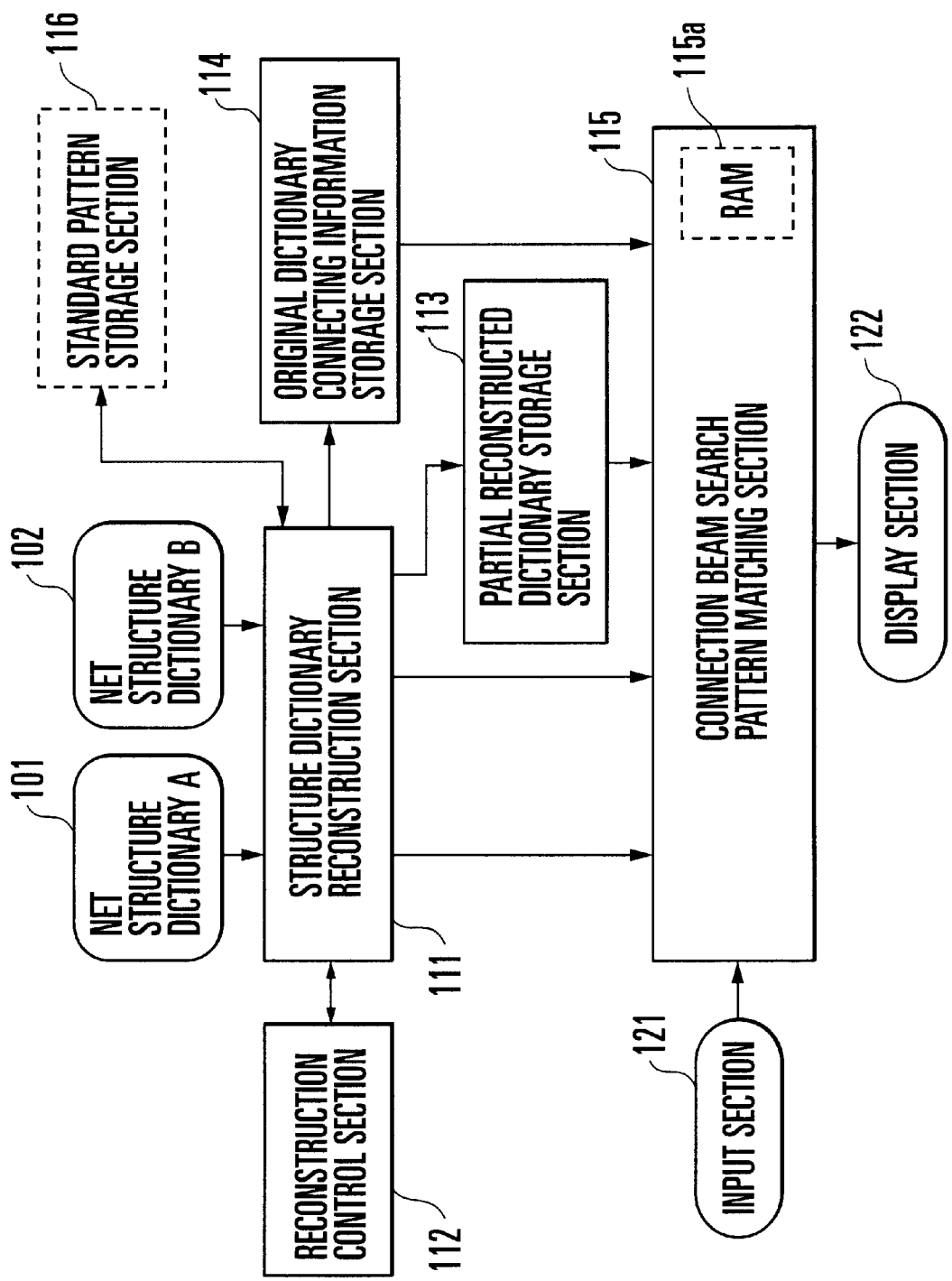
FIG. 1 is a block diagram of a pattern recognition apparatus according to an embodiment of the present invention.

FIG. 1 shows a pattern recognition apparatus according to an embodiment of the present invention. In this embodiment, a pattern recognition apparatus using two net structure dictionaries will be described.

Referring to FIG. 1, the pattern recognition apparatus comprises a net structure dictionary (A) 101, a net structure dictionary (B) 102, a structure dictionary reconstruction section 111 for receiving the outputs from the net structure dictionaries 101 and 102, a reconstruction control section 112 for receiving/outputting data from/to the structure dictionary reconstruction section 111, a partial reconstructed dictionary storage section 113 and original dictionary connecting information storage section 114 for receiving the outputs from the structure dictionary reconstruction section 111, connection beam search pattern matching section 115 which has a RAM 115a and receives the outputs from the partial reconstructed dictionary storage section 113 and original dictionary connecting information storage section 114, an input section 121 for inputting data to the connection beam search pattern matching section 115, and a display section 122 for receiving the output from the connection beam search pattern matching section 115.

Figure 6:
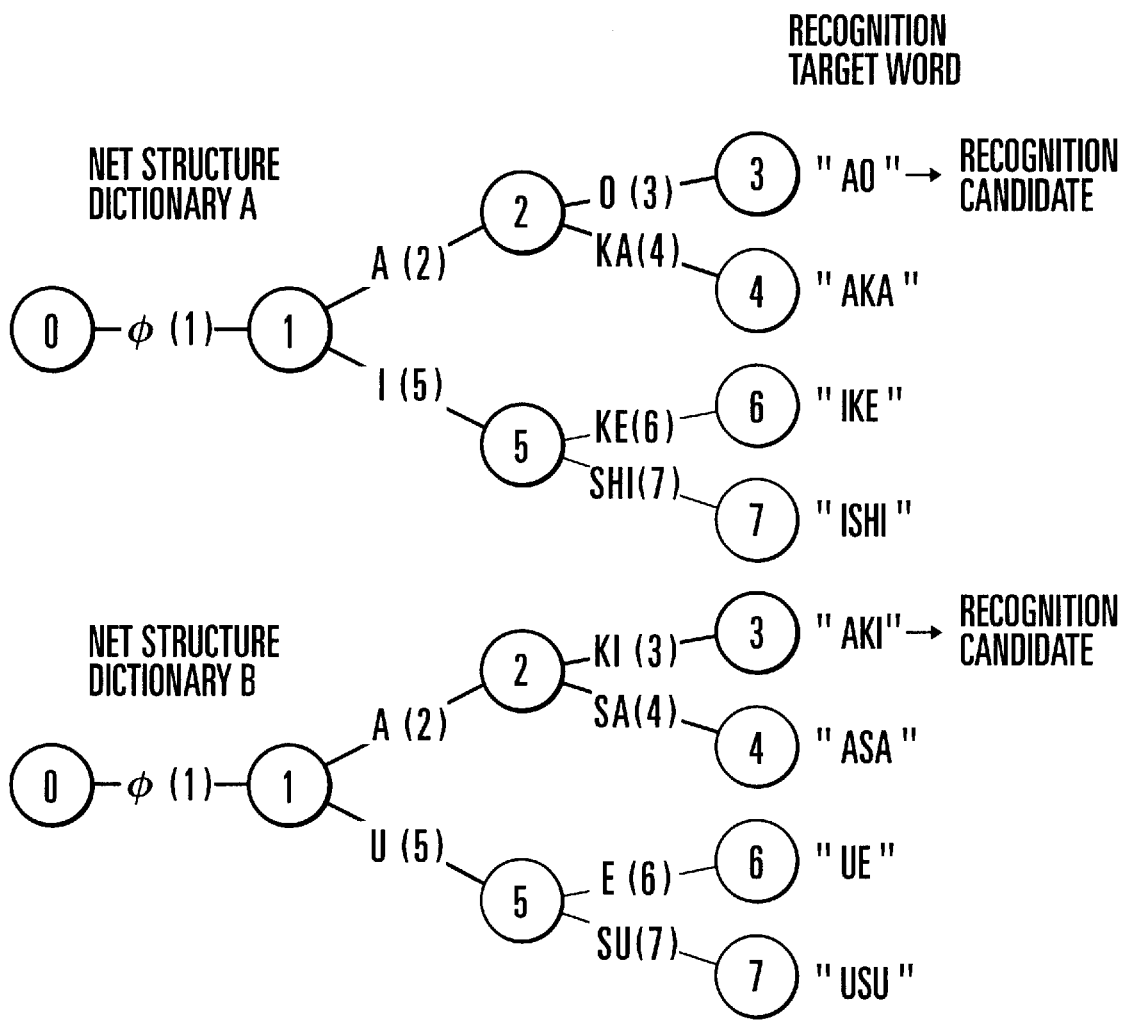
FIG. 6 is a view showing an example in which two net structure dictionaries are used.
Figure 8:
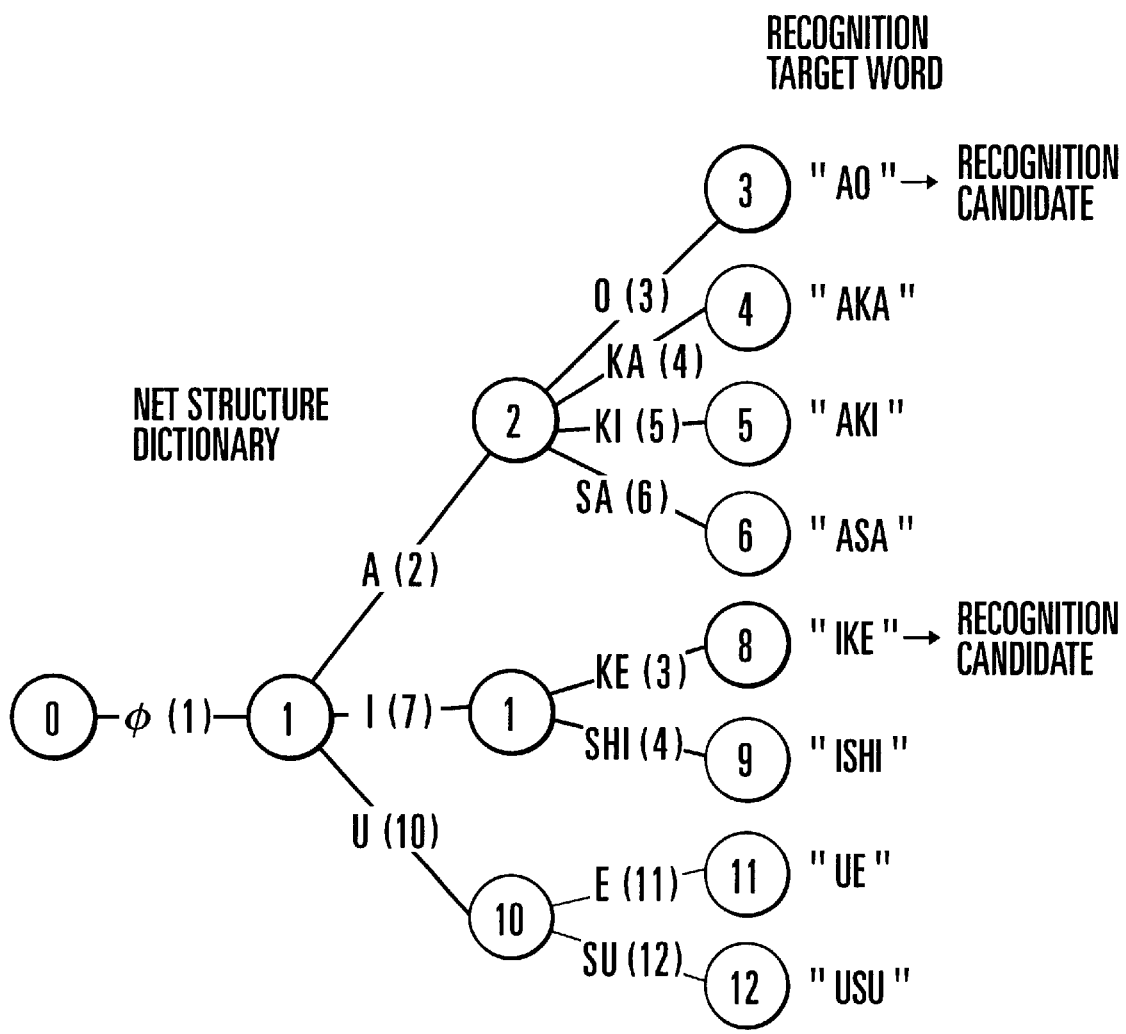
FIG. 8 is a view showing an example in which a single net structure dictionary is used.
Figure 9:
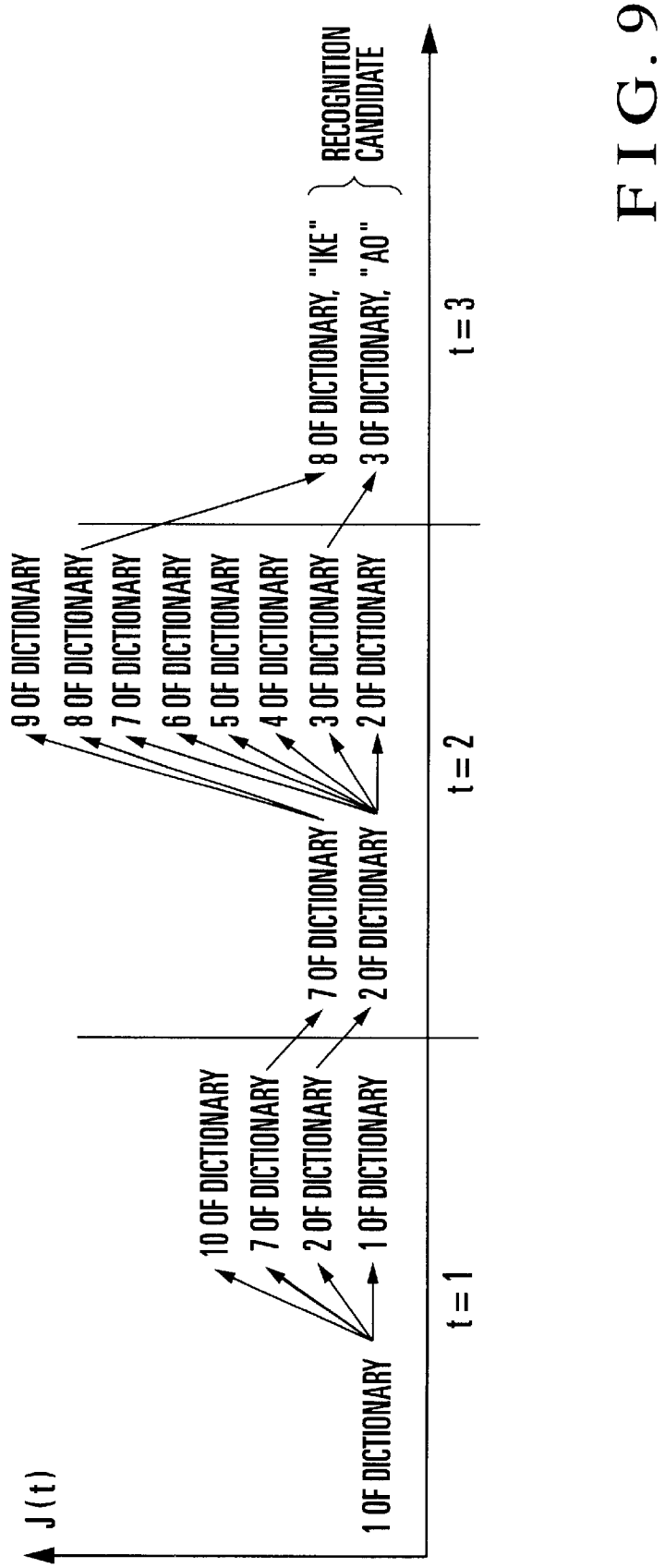
FIG. 9 is a timing chart showing the recognition operation of the conventional pattern recognition apparatus using the net structure dictionary shown in FIG. 8.

The net structure dictionaries 101 and 102 have the same structures as those of the net structure dictionaries A and B shown in FIG. 6. More specifically, each of the net structure dictionaries 101 and 102 has a plurality of types of standard patterns as recognition units of a recognition target, and forms a net structure by connecting, through nodes, the standard patterns as a parent arc representing a common portion and child arcs representing the remaining portions.

Referring to FIG. 6, "AO (blue in Japanese)" as a recognition target is formed from standard patterns "A" and "O", and "AKA (red in Japanese)" is formed from standard patterns "A" and "KA". Of these standard patterns, the common standard pattern "A" is used as a parent arc, and "O" and "KA" are used as child arcs. The parent arc and child arcs are connected through node #2 to form a net structure.

The net structure dictionaries 101 and 102 may be formed from not standard patterns but identifies of standard patterns, and standard patterns stored in a standard pattern storage section 116 (FIG. 1) may be referred to and used in accordance with an identifier. In this case, common standard patterns can be put together, and the entire number of data can be reduced.

First, the structure dictionary reconstruction section 111 extracts a structure common to the net structure dictionaries 101 and 102. This extraction processing is called dictionary reconstruction processing. The structure dictionary reconstruction section 111 outputs the extracted common structure to the partial reconstructed dictionary storage section 113 and stores the extracted common structure in the original dictionary connecting information storage section 114 as original dictionary connecting information connecting the structure dictionaries 101 and 102 as extraction sources. The original dictionary connecting information connects the structure dictionaries 101 and 102 to the partial reconstructed dictionary.

The reconstruction control section 112 determines the reconstructed portion in the structure dictionaries 101 and 102 as extraction sources and determines completion of reconstruction. On the basis of the determination result, the reconstruction control section 112 controls reconstruction processing by the structure dictionary reconstruction section 111. The reconstruction control section 112 also controls the outputs from the structure dictionary reconstruction section 111 to the partial reconstructed dictionary storage section 113 and original dictionary connecting information storage section 114.

More specifically, when the reconstruction control section 112 determines that reconstruction processing by the structure dictionary reconstruction section 111 is ended, the structure dictionary reconstruction section 111 outputs the common structure to the partial reconstructed dictionary storage section 113. Simultaneously, the structure dictionary reconstruction section 111 outputs the original dictionary connecting information to the original dictionary connecting information storage section 114. The common structure and original dictionary connecting information are stored in the partial reconstructed dictionary storage section 113 and original dictionary connecting information storage section 114, respectively.

The connection beam search pattern matching section 115 first selects standard patterns (arcs) as matching targets using the structure dictionaries 101 and 102 as extraction sources, the partial reconstructed dictionary stored in the partial reconstructed dictionary storage section 113, and the original dictionary connecting information stored in the original dictionary connecting information storage section 114. The connection beam search pattern matching section 115 executes pattern matching using beam search for an input pattern as a matching target input from the input section 121 and its standard patterns and outputs, as a recognition result, a recognition target of best matching in the dictionaries.

In the above-described pattern recognition apparatus, the common structure is extracted, and standard patterns having repetition across the plurality of dictionaries are put together, thereby suppressing the maximum number of search matching paths. In addition, for standard patterns with less repetition, standard patterns in the original dictionary are used on the basis of the original dictionary connecting information.

According to this embodiment, even when the number of search matching paths is increased, and a large dictionary is used, the capacity of the RAM 115$a$ for storing the search matching paths in the connection beam search pattern matching section 115 can be suppressed. In addition, only part of the original dictionary is reconstructed, the processing time necessary for reconstruction is much shorter than that in reconstructing the entire original dictionary.

The operation of the above-described pattern recognition apparatus will be described below in more detail.

The pattern recognition apparatus reconstructs the dictionary before an input pattern is input, and performs pattern matching processing after reconstruction processing is ended. The reconstruction processing will be described. Let $\lambda 0$ be the partial reconstructed dictionary to be stored in the partial reconstructed dictionary storage section 113, and CO and CPA be the original dictionary connecting information to be stored in the original dictionary connecting information storage section 114.

$\lambda 0 = (N0, A0, EN0, PA0)$ for
N0={n0_i: i=0, 1, ..., I0}
A0={a0_i: i=1, 2, ..., I0}
EN0(a0_i): the end node of an arc a0_i
PA0(n0_i): the set of arcs having a node n0_i as a start node With the above definition, the partial reconstructed dictionary and original dictionary connecting information are generated and stored in accordance with the following procedure. In the following procedure, let num[ ] be a calculation that gives the number of elements of a set, argmax[g[·|x] be a calculation for giving a value x that gives the maximum value, (−) be a calculation for removing an element from a set, (Σ) be a calculation for obtaining the sum of a plurality of sets, and " " a standard pattern represented by an arc.

In addition, let B be the sets of arcs as reconstruction candidates (reconstruction targets for which reconstruction is not determined) formed by merging the arcs of the original dictionary, O be the sets of start nodes of arcs of the set B, I0 be the identification number of the latest node for which reconstruction is determined, J be the identification number of the arc as the latest reconstruction candidate, C(b) be the sets of arcs of the original dictionary, which are merged as an arc b of the set B, SN(b) be the start node of the arc b of the set B, M(n) be the sets of arcs as reconstruction candidates having, as a start node, a node n of the set O, Ith be the maximum number of arcs which can be stored, φ be the empty set, φ be the route arc common to all net structure dictionaries, and n be the start node of the latest arc for which reconstruction is determined.

<Initial Settings>
START
Step S0
    I0=1
    N0={n0_0}
    A0={φ}
    PA0(n0_0)={φ}
    O={n0_0}
    B={b1=φ}
    J=1
    C(b1)={av_1|v=1, 2, ..., V}
    SN(b1)=n0_0
    M(n0_0)={b1}
    bm=b1
    n=n0_0
<Processing Main Body>
Step S1
    A0←A0 ∪ {a0_I0=bm}
    N0←N0 ∪ {n0_I0}
    EN0(a0_I0)=n0_I0
    PA0(n)←PA0(n) ∪ {a0_I0}
Step S2
    L={av_k|av_k∈ PAv(EN(av_i)), av_i ∈ C(bm)}
    T={"av_k"|av_k ∈ L}
    M(n0_I0)={bj|j=J+1, ..., J+num[T], "bj"="av_k" ∈ T}
    C(bi)={av_k|"bj"="av_k", av_k ∈ L, bj ∈ M(nI0)}
    J←J+num[M(n0_I0)]
Step S3
    B←B (−) {bm} ∪ M(n0_I0)
    O←O ∪ {n0_I0}
    M(n)←M(n) (−) {bm}
    If M(n)={φ}, O←O (−) {n}
Step S4
    If I0≧Ith, the flow advances to S8.

Step S5 bm=argmax[num[C(bj)]|bj] {bj ∈ B(t)} n=SN(bm)

Step S6

If num[C(bm)]=1, the flow advances to S8.

Step S7

I0←I0+1, the flow advances to S1.

Step S8

CO=O

CPA(n0_i)={av_k|av_k ∈ C(bj), bj ∈ M(n0_i)}

(n0_i ∈ CO)

END

The above procedure will be described. First, the reconstruction control section 112 outputs a control signal to the structure dictionary reconstruction section 111, partial reconstructed dictionary storage section 113, and original dictionary connecting information storage section 114 so as to initially set related variables. The reconstruction control section 112 and the sections 111, 113, and 114 which have received the control signal perform initial setting processing (step S0). At this time, the reconstruction control section 112 determines reconstruction of a root arc b1 (=φ) common to all dictionaries as reconstruction candidates and notifies the structure dictionary reconstruction section 111 of it as an ark bm for which reconstruction is determined.

Next, the structure dictionary reconstruction section 111 generates net information A0, N0, EN0, and PA0 for the arc bm for which reconstruction is determined, as notified by the reconstruction control section 112, and outputs them to the partial reconstructed dictionary storage section 113 (step S1). The pieces of net information construct the dictionary to be reconstructed. The structure dictionary reconstruction section 111 performs extraction L of an arc as a new reconstruction target and merge processing M for removing repetition of standard patterns of the extracted arc, lists up an arc M after merging, and execute processing C of making the arc M after merging correspond to the original arc (step S2).

The structure dictionary reconstruction section 111 adds the arc M after merging and a new node nI0 to the reconstruction candidates B and O, removes the arc bm which has already been determined and output in step S1 from the arc B as a reconstruction candidate, and also removes the arc bm from the arc M(n) as a reconstruction candidate having the start node n of the arc bm as a start node. If there is no arc M(n) as a reconstruction candidate having the start node n as a start node, the start node n is removed from the node O as a reconstruction candidate. If the arc M(n) as a reconstruction candidate remains, the node O as a reconstruction candidate is unprocessed (step S3). In any case, control is shifted to the reconstruction control section 112.

When control is shifted from the structure dictionary reconstruction section 111, the reconstruction control section 112 determines whether the reconstructed dictionary has a size larger than a predetermined size (step S4). If it is determined that the reconstructed dictionary is smaller than the predetermined size, an arc with an optimum arc with a highest merge efficiency is selected from the arc B as a reconstruction candidate as the arc bm for which reconstruction is to be determined (step S5), and it is determined whether merging is possible (step S6). If YES in step S6, a control signal for instructing to execute step S1 is output to the structure dictionary reconstruction section 111.

If NO in step S6, the reconstruction control section 112 outputs a control signal for instructing to end reconstruction processing to the structure dictionary reconstruction section 111. The structure dictionary reconstruction section 111 replaces the arc B as a reconstruction candidate with the arc of the original dictionary and outputs the replaced arc CPA and undetermined node CO to the original dictionary connecting information storage section 114 as original dictionary connecting information (step S8). Thus, reconstruction is ended.

When the dictionary reconstructed by the reconstruction control section 112 is larger than the predetermined size, the flow also advances to step S8, and the reconstruction control section 112 outputs a control signal for instructing reconstruction end processing to the structure dictionary reconstruction section 111. The structure dictionary reconstruction section 111 replaces the arc B as a reconstruction candidate with the arc of the original dictionary and outputs the replaced arc CPA and undetermined node CO to the original dictionary connecting information storage section 114 as original dictionary connecting information (step S8). Thus, reconstruction is ended.

When the two net structure dictionaries A and B shown in FIG. 6 are reconstructed by the above-described operation, the following net information can be obtained.

When processing in steps S1 to S5 in the first cycle is ended, the net information representing the reconstructed dictionary and dictionary connecting information is as follows.

A0=[b1], PA0(n0_0)=[b1],

T=["A", "I", "U"],

O=[n0_1], M(n0_0)=[φ],

M(n0_1)=[b2, b3, b4], J=4,

"b2"="A", "b3"="I", "b4"="U",

B=[b2, b3, b4],

C(b2)=[a1_2, a2_2], C(b3)=[a1_5], C(b4)=[a2_5], bm=b2, n=n0_1

When processing in steps S1 to S5 in the second cycle is ended, the following net information is obtained.

A0=[b1, b2], PA0(n0_0)=[b1], PA0(n0_1)=[b2],

T=["O", "KA", "KI", "SA"],

O=[n0_1, n0_2], M(n0_0)=[φ], M(n0_1)=[b3, b4], J=8

M(n0_2)=[b5, b6, b7, b8],

"b5"="O", "b6"="KA", "b7"="KI", "b8"="SA",

B=[b3, b4, b5, b6, b7, b8],

C(b3)=[a1_5], C(b4)=[a2_5], C(b5)=[a1_3],

C(b6)=[a1_4], C(b7)=[a2_3], C(b8)=[a2_4]

Since the condition in step S6 is satisfied, processing in step S8 is executed, and the following net information is obtained.

A0=[b1, b2], N0=[n0_0, n0_1, n0_2], PA0(n0_0)=[b1], PA0(n0_1)=[b2], CO=[n0_1, n0_2]

CPA(n0_1)=[a1_5, a2_5], CPA(n0_2)=[a1_3, a1_4, a2_3, a2_4]

When reconstruction of the dictionary is ended, the connection beam search pattern matching section 115 performs pattern matching in accordance with the following procedure to obtain a recognition result. In the initial settings, the start of the reconstructed dictionary is set at the arc of the first search matching path J. When the start node of the arc to be calculated is stored in the original dictionary connecting information storage section 114, the arc of the reconstructed dictionary using the node as a start node or the arc of the original dictionary is selectively used, and pattern matching is performed in consideration of the connection between the dictionaries.

Figure 2:
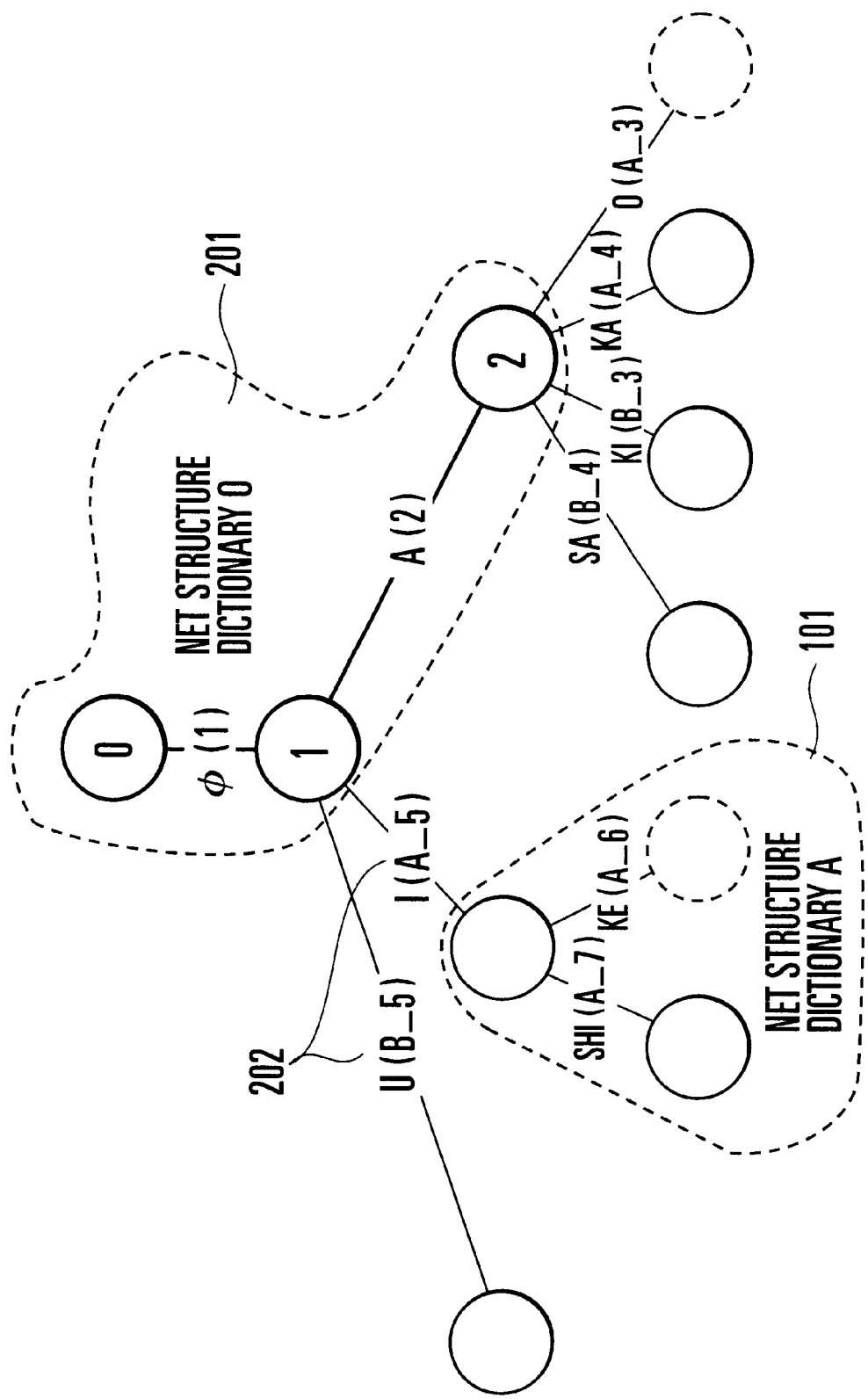
FIG. 2 is a view schematically showing the structure of a dictionary reconstructed by the pattern recognition apparatus shown in FIG. 1.
Figure 3:
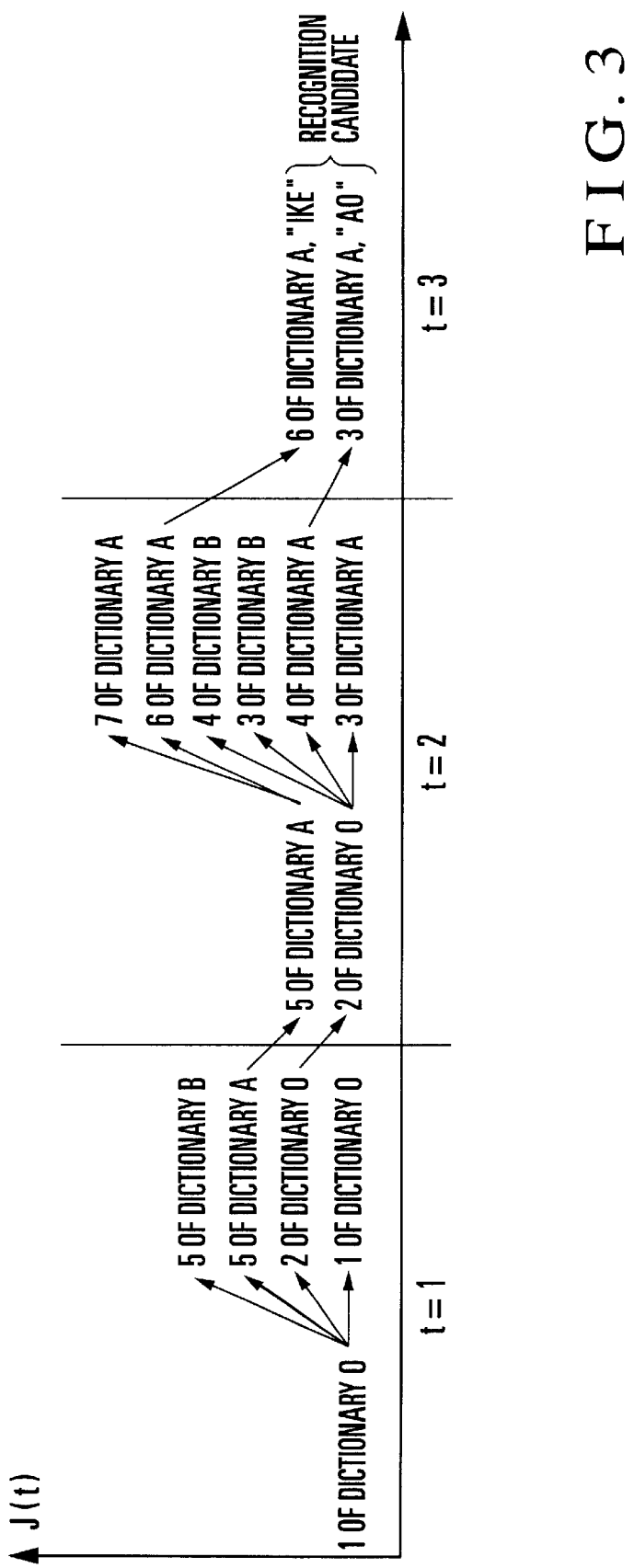
FIG. 3 is a timing chart showing the recognition operation of the pattern recognition apparatus shown in FIG. 1.
Figure 4:
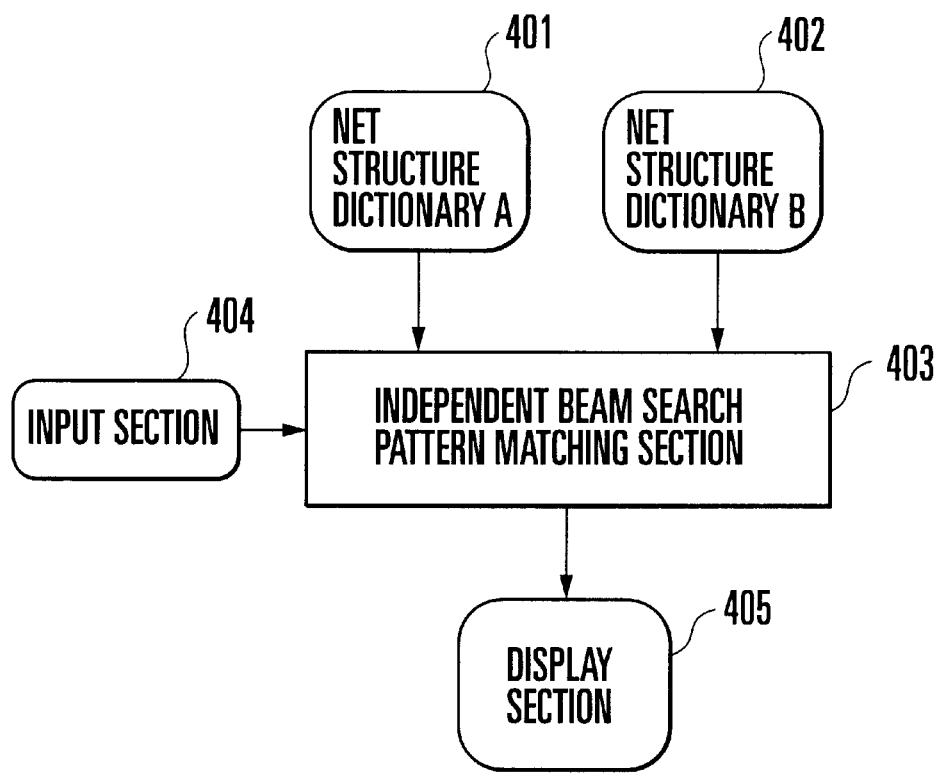
FIG. 4 is a block diagram of a conventional pattern recognition apparatus.

<Initial Settings>
Step S10
  J(0)={0_1}
  g(0, v_k)=∞{k=1, 2, . . . , Jv, v=1, . . . , V}
  g(0, 0_1)=d(0, 0_1)
  t=1
<Processing Main Body>
  Step S11
    If v=0, n0_j ∈ CO in v_j ∈ J(t−1), i.e., the node as a calculation target may belong to the reconstructed dictionary, and the arc as a calculation target may not belong to the reconstructed dictionary, the flow advances to step S14.
  Step S12
    g(t, v_k)=min[g(t−1, v_k), g(t−1, v_j)]+d(t, v_k)
    {av_k ∈ PAv(EN(av_j)), v_j ∈ J(t−1)}
    J(t)={argmin[g(t, v_k)|S]}
  Step S13
    If t<T, the flow returns to step S11.
    If t≧T, the flow advances to step S16.
  Step S14
    For a0_k ∈ PA0(EN(a0_j)),
    g(t, 0_k)=min[g(t−1, 0_k), g(t−1, 0_j)]+d(t, 0_k)
    For av_m ∈ CPA(EN(a0_j)),
    g(t, v_m)=min[g(t−1, v_m), g(t−1, 0_j)]+d(t, v_m)
    J(t)={argmin[g(t, 0_k), g(t, v_m)|S]}
  Step S15
    If t<T, the flow returns to step S11.
  Step S16
    V_m=argmin[g(T, v_k)|1]
    v_k ∈ J(t), EN(av_k) ∈ WNv, v=1, 2, . . . , V
    Recognition result: w that satisfies WNv(w)=EN(av_m)
END As described above, according to this embodiment, the two net structure dictionaries 101 and 102 are reconstructed like a net structure dictionary (O) 201 shown in FIG. 2. Pattern matching can be performed, as shown in FIG. 3, using the net structure dictionary (O) 201, original dictionary connecting information 202, net structure dictionary (A) 101, and net structure dictionary (B) 102.

More specifically, at time t=1, arcs connected to node #1 of the reconstructed net structure dictionary (O) 201 are loaded to the RAM 115a of the connection beam search pattern matching section 115. Next, the connection beam search pattern matching section 115 selects arc (5) of the net structure dictionary (A) 101, arc (5) of the net structure dictionary (B) 102, and arcs (2) and (1) using the original dictionary connecting information 202 as next recognition candidates.

At time t=2, the connection beam search pattern matching section 115 selects arc (5) of the net structure dictionary (A) 101 and arc (2) of the reconstructed net structure dictionary (O) 201, as arcs (search matching path) matching the input recognition target and loads them to the RAM 115a. Then, the connection beam search pattern matching section 115 selects arcs (7), (6), (4), and (3) of the net structure dictionary (A) 101 and arcs (4) and (3) of the net structure dictionary (B) 102 as next recognition candidates.

Finally, at time t=3, the connection beam search pattern matching section 115 selects arc (6) of the net structure dictionary (A) 101 and arc (3) of the net structure dictionary (B) 102 as arcs (search matching path) matching the input recognition target, connects them to the arcs that have already been loaded to the RAM 115a, and displays them on the display section 122 as a result of recognition candidate.

In the above beam search, two search matching paths are used. As the original candidates used to narrow down the search matching paths, arcs (1) and (2) of the net structure dictionary (O) 201, and also, the nodes of the net structure dictionaries (A) 101 and (B) 102 connected by the original dictionary connecting information 202 can be used. Hence, the recognition performance does not degrade.

In the above-described embodiment, an arc is formed from one standard pattern. However, an arc may be formed by connecting a plurality of standard patterns by extending the beam search procedure. A dictionary structure containing standard patterns has been described above. However, dictionaries may be separated into a dictionary containing standard patterns and dictionary containing the identifiers of standard patterns.

Pattern recognition for discrete recognition has been described above. However, continuous recognition can also be executed by storing connecting information from the original dictionary to the reconstructed dictionary, and storing an arc number that gives the minimum distance in units of nodes. The dictionary is reconstructed to merge the maximum number of arcs. However, a technique of determining an arc to be reconstructed on the basis of the number of arcs from the root node to the start node of the arc may be used. Alternatively, the number of dictionaries to which an arc to be reconstructed may be used to determine the arc.

As has been described above, according to the present invention, a plurality of child arcs are selected as matching targets across a plurality of net structure dictionaries by using a reconstructed dictionary. As a consequence, the RAM use capacity depending on the maximum number of matching paths can be suppressed without increasing the maximum number of search matching paths. Additionally, since for standard patterns with less repetition, standard patterns in the original dictionary are used, the use capacity of the RAM for storing the newly reconstructed dictionary need not be large. Furthermore, since only part of the original dictionary is reconstructed, reconstruction can be performed in a much shorter time as compared to a case wherein the original dictionary is entirely reconstructed.

Hence, according to the present invention, a pattern recognition apparatus can be obtained, which requires no large-capacity RAM to compensate the recognition performance and can set a recognition target with a variety of choices simultaneously using a plurality of net structure dictionaries.

What is claimed is:

1. A pattern recognition apparatus comprising:
   a plurality of net structure dictionaries, each said dictionary having a net structure formed by connecting, through a node, a parent arc representing a common portion of a plurality of standard patterns as recognition units of a recognition target to a child arc representing a remaining portion;
   a reconstructor for extracting a common structure from said plurality of net structure dictionaries and reconstructing the net structure dictionaries to generate a reconstructed dictionary;
   a first storage for storing original-dictionary-connecting information representing a relationship between the extracted common structure and said plurality of net structure dictionaries; and
   a pattern matching module for referring to said plurality of net structure dictionaries, the reconstructed dictionary generated by said reconstructor, and the original-dictionary-connecting information stored in said first storage and performing pattern matching processing between an input pattern and recognition targets formed from standard patterns using a beam search, thereby selecting a recognition candidate from the recognition targets.

2. An apparatus according to claim 1, wherein each of said plurality of net structure dictionaries is represented by a set of identifiers of the standard patterns.

3. An apparatus according to claim 2, wherein said apparatus further comprises a standard pattern storage for storing the standard patterns, and the standard patterns in said standard pattern storage are referred to in accordance with the identifiers which form said plurality of net structure dictionaries.

4. An apparatus according to claim 1, wherein:

said apparatus further comprises a second storage for storing the reconstructed dictionary generated by said reconstructor, and said pattern matching module performs pattern matching processing by referring to said plurality of net structure dictionaries, the reconstructed dictionary stored in said second storage, and the original dictionary connecting information stored in said first storage.

5. An apparatus according to claim 1, wherein:

said apparatus further comprises a control module for determining completion of reconstruction processing by said reconstructor, and said pattern matching module starts pattern matching processing when said control module determines completion of reconstruction processing.

6. An apparatus according to claim 1, further comprising:

a matching path storage sequentially storing a plurality of search matching paths matching the recognition targets as a result of pattern matching processing by said pattern matching module.

7. An apparatus according to claim 6, further comprising:

a display for displaying the search matching paths stored in said matching path storage.

8. A pattern recognition method using a plurality of net structure dictionaries, said method comprising:

extracting a common structure from a plurality of net structure dictionaries and reconstructing the net structure dictionaries to generate a reconstructed dictionary, each said dictionary having a net structure formed by connecting, through a node, a parent arc representing a common portion of a plurality of standard patterns as recognition units of a recognition target to a child arc representing a remaining portion;

storing original-dictionary-connecting information representing a relationship between the extracted common structure and said plurality of net structure dictionaries; and performing pattern matching processing between an input pattern and recognition targets formed from standard patterns.

9. A signal-bearing medium tangibly embodying a program of machine-readable instructions executable by a digital processing apparatus to perform a method of pattern recognition method using a plurality of net structure dictionaries, said method comprising:

extracting a common structure from a plurality of net structure dictionaries and reconstructing the net structure dictionaries to generate a reconstructed dictionary, each said dictionary having a net structure formed by connecting, through a node, a parent arc representing a common portion of a plurality of standard patterns as recognition units of a recognition target to a child arc representing a remaining portion;

storing original-dictionary-connecting information representing a relationship between the extracted common structure and said plurality of net structure dictionaries; and performing pattern matching processing between an input pattern and recognition targets formed from standard patterns.

* * * * *